United States Patent
Parthasarathi et al.

(10) Patent No.: US 10,674,222 B2
(45) Date of Patent: Jun. 2, 2020

(54) TECHNIQUES FOR GENERATING SUBTITLES FOR TRAILERS

(71) Applicant: NETFLIX, INC., Los Gatos, CA (US)

(72) Inventors: Murthy Parthasarathi, San Jose, CA (US); Yadong Wang, Campbell, CA (US); Boney Sekh, Cupertino, CA (US)

(73) Assignee: NETFLIX, INC., Los Gatos, CA (US)

( * ) Notice: Subject to any disclaimer, the term of this patent is extended or adjusted under 35 U.S.C. 154(b) by 28 days.

(21) Appl. No.: 15/875,989

(22) Filed: Jan. 19, 2018

(65) Prior Publication Data
US 2019/0230417 A1    Jul. 25, 2019

(51) Int. Cl.
| | |
|---|---|
| H04N 5/93 | (2006.01) |
| G11B 27/00 | (2006.01) |
| H04N 21/485 | (2011.01) |
| G06F 16/432 | (2019.01) |
| G11B 27/031 | (2006.01) |
| G11B 27/34 | (2006.01) |
| H04N 21/233 | (2011.01) |
| H04N 21/488 | (2011.01) |
| H04N 21/8547 | (2011.01) |
| H04N 21/8549 | (2011.01) |
| H04N 9/80 | (2006.01) |

(52) U.S. Cl.
CPC ....... *H04N 21/4856* (2013.01); *G06F 16/433* (2019.01); *G11B 27/00* (2013.01); *G11B 27/031* (2013.01); *G11B 27/34* (2013.01); *H04N 21/233* (2013.01); *H04N 21/4884* (2013.01); *H04N 21/8547* (2013.01); *H04N 21/8549* (2013.01)

(58) Field of Classification Search
USPC ................ 386/278, 285, 281, 239, 245, 248
See application file for complete search history.

(56) References Cited

U.S. PATENT DOCUMENTS

| | | | |
|---|---|---|---|
| 9,070,367 B1 * | 6/2015 | Hoffmeister | G10L 15/187 |
| 9,286,808 B1 * | 3/2016 | Raley | G09B 15/003 |
| 2007/0226620 A1 * | 9/2007 | Togashi | G11B 27/322 |
| | | | 715/700 |
| 2009/0164904 A1 | 6/2009 | Horowitz et al. | |
| 2018/0158469 A1 * | 6/2018 | Zhao | G10L 15/04 |

FOREIGN PATENT DOCUMENTS

EP    1 729 173 A2    12/2006

OTHER PUBLICATIONS

International Search Report for application No. PCT/US2019/013536 dated Mar. 28, 2019.

* cited by examiner

Primary Examiner — Daquan Zhao
(74) Attorney, Agent, or Firm — Artegis Law Group, LLP

(57) ABSTRACT

In various embodiments, a subtitle application generates a subtitle list for a trailer. In operation, the subtitle application performs matching operation(s) between trailer audio associated with a trailer and source audio associated with an audiovisual program. The subtitle application then maps a subtitle associated with the source audio from a source timeline associated with the source audio to a trailer timeline associated with the trailer audio to generate a mapped subtitle. Subsequently, the subtitle application generates a trailer subtitle list based on the mapped subtitle and at least one additional mapped subtitle. Because the subtitle application generates the trailer subtitle list based on audio comparisons, the subtitle application ensures that the proper subtitles are included in the trailer subtitle list without requiring a subtitler to view the trailer.

20 Claims, 5 Drawing Sheets

US 10,674,222 B2

TECHNIQUES FOR GENERATING SUBTITLES FOR TRAILERS

BACKGROUND OF THE INVENTION

Field of the Invention

Embodiments of the present invention relate generally to audiovisual processing and, more specifically, to techniques for generating subtitles for trailers.

Description of the Related Art

A typical trailer is a sequence of segments that are extracted from the source files of an audiovisual program, such as a television program or a movie, for the purpose of advertising the audiovisual program. For example, the first eight seconds of a trailer for a television program could consist of the first five seconds of the fourth episode of the television program, followed by the last three seconds of the eighth episode of the television program.

To expedite the release of a trailer, a trailer editor typically starts to generate the trailer before the source files are finalized. After the trailer is finalized, subtitles are generated. The subtitles allow viewers who suffer from hearing loss or who do not understand the spoken dialog associated with the trailer to follow the spoken dialog. Because subtitled trailers are typically released in multiple countries and/or one or more multilingual countries, subtitles are typically generated for numerous different languages.

Typically, for each language, a professional subtitler that is proficient in the language views the trailer to manually generate the relevant subtitles. These manual efforts are tedious and time consuming and oftentimes cause delays in releasing the trailers. Among other things, such delays reduce the overall effectiveness of advertising efforts that rely on the trailers. Further, the resulting subtitles for the trailers are often inconsistent with the subtitles for the source files. For instance, the spelling of a character name in the subtitle for a trailer may be different than the spelling of the character name in the corresponding subtitle for the corresponding source.

As the foregoing illustrates, what is needed in the art are more effective techniques for generating subtitles for trailers.

SUMMARY OF THE INVENTION

One embodiment of the present invention sets forth a computer-implemented method for generating subtitles for trailers. The method includes performing one or more matching operations between a trailer audio associated with a trailer and a first source audio associated with an audiovisual program to determine that a first segment of the trailer audio corresponds to a second segment of the first source audio; mapping a first subtitle associated with the first source audio from a source timeline associated with the first source audio to a trailer timeline associated with the trailer audio to generate a first mapped subtitle; and generating a trailer subtitle list based on the first mapped subtitle and at least one additional mapped subtitle.

One advantage of the disclosed techniques is that the amount of manual work required to generate subtitles for the trailer is reduced. In particular, the technological improvement relative to the prior art is that the disclosed techniques use automated audio comparisons to identify the relevant subtitles. Automatically identifying the relevant subtitles and then automatically mapping the identified subtitles from the source timeline to the trailer timeline enables accurate subtitles to be generated without requiring professional subtitlers to view the trailer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

The disclosed techniques may be used to efficiently generate subtitles for trailers. For each audio edit included in a edit decision list (EDL), a subtitle application identifies a corresponding trailer segment included in an audio file associated with the trailer based on the trailer start and end times specified in the audio edit. For each trailer segment, the subtitle application evaluates different sources (e.g., episodes) associated with the trailer until the subtitle application identifies an audio match for the trailer segment. More precisely, to evaluate a particular source, the subtitle application extracts a test segment from an audio file associated with the source based on the source start and end times specified in the audio edit and a timing leeway that extends the length of the test segment.

The subtitle application then computes a cross-correlation between the trailer segment and the test segment. The subtitle application computes a best matching segment included in the test segment and a corresponding match strength based on the cross-correlation. If the match strength exceeds a match threshold, then the subtitle application identifies the best matching segment as an audio match for the trailer segment. After determining audio matches for all the trailer segments, the subtitle application generates a trailer subtitle list for each language. In operation, for a particular language, the subtitle application retrieves existing subtitles associated with the audio match and the language. The subtitle application then maps the retrieved subtitles to the timeline of the trailer and assembles the mapped subtitles into a trailer subtitle list for the language.

Advantageously, by generating subtitle lists for trailers based on audio edits, audio comparison operations, and subtitles lists for sources, the subtitle application automatically generates accurate subtitles that are consistent with the corresponding subtitles for the corresponding sources. Notably, the subtitle application disregards the potentially erroneous identifications of source files specified in the audio edits. Further, the timing leeway mitigates inaccuracies commonly associated with source times specified in the audio edits. Unlike conventional approaches to generating subtitles for trailers, professional subtitles do not need to view the finalized trailers to generate accurate subtitles. Consequently, both the manual effort associated with generating subtitles and the likelihood that generating subtitles delays the release of a trailer are decreased.

System Overview

Figure 1:
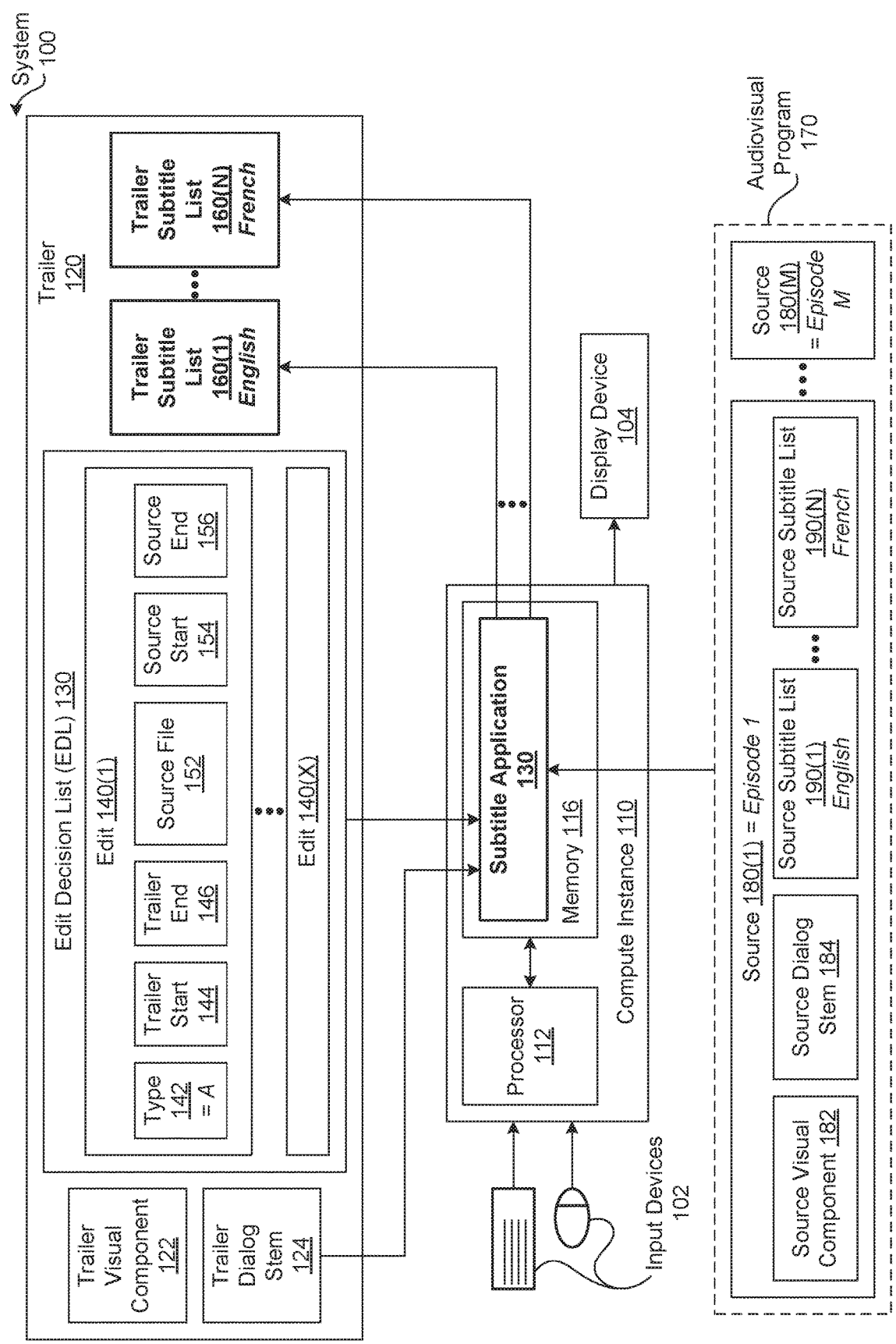
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, a compute instance 110, input devices 102, a display device 104, a trailer 120, and an audiovisual program 170. For explanatory purposes, multiple instances of like objects are denoted with reference numbers identifying the object and parenthetical numbers identifying the instance where needed.

Any number of the components of the system 100 may be distributed across multiple geographic locations or included in one or more cloud computing environments (i.e., encapsulated shared resources, software, data, etc.) in any combination. For example, the audiovisual program 170 could be stored in a memory device located in Mumbai, the trailer 120 could be stored in a memory device located in Montreal, and the compute instance 110 could be included in a private cloud.

The compute instance 110 includes, without limitation, a processor 112 and a memory 116. The compute instance 110 may also be a user device. A user device is any type of device that is capable of transmitting input data and/or displaying visual content. For example, a user device could comprise a game console, a smartphone, a smart television (TV), a laptop, a tablet, or a desktop computer.

The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The processor 112 receives input via any number of the input devices 102. The processor 112 generates pixels for display via the output devices 104. Examples of the input devices 102 include, without limitation, a mouse, a keyboard, a microphone, and the like. The output device 104 may be any device capable of displaying images and/or visual content, such as a monitor. The input device 102 and each output device 104 may be a stand-alone device or may be integrated into another device, such as the compute instance 110 or a user device.

In various embodiments, the system 100 may include any number of compute instances 110, any number of input devices 102, any number of display devices 104, and any number of audiovisual programs 170, and any number of trailers 120 in any combination. Further, although not shown in FIG. 1, the system 100 may include any number of user devices and any number of input/output devices in any combination. Each of the input devices 102, output device 104, and input/output devices may communicate with any number of the compute instances 110 and any number of the user devices in any combination and in any technically feasible fashion.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instance 110 is configured to implement one or more applications. More specifically, the compute instance 110 performs operations involved in generating subtitles for the trailer 120. In general, the trailer 120 includes a sequence of segments that are extracted from source files associated with the audiovisual program 170 for the purpose of advertising the audiovisual program 170. For example, the first eight seconds of the trailer 120 for a television program could consist of the first five seconds of a fourth episode of the television program, followed by last three seconds of an eighth episode of the television program.

As shown, the audiovisual program 170 includes, without limitation, any number of sources 180. In the example depicted in FIG. 1, the audiovisual 170 includes M sources 180, where each of the sources 180 is a different episode of a single television program. In various embodiments, the audiovisual program 170 may include any amount of audio visual content that is distributed across any number of sources 180 in any fashion. For instance, in some embodiments, the audiovisual program 170 comprises a feature length file, and each of the sources 180 comprises a different portion of the feature length film. In other embodiments, the audiovisual program 170 comprises a set of music videos, and each of the sources 180 comprises a different music video.

As shown for the source 180(1), each of the sources 180 includes, without limitation, a source visual component 182, a source dialog stem 182, and any number of sources subtitles lists 190. The source video component 182 specifies any amount of visual content associated with the source 180. More specifically, the source video component 182 includes any number of different shot sequences (not shown), where each shot sequence includes a set of frames that usually have similar spatial-temporal properties and run for an uninterrupted period of time. As a general matter, each frame included in the visual component 182 is related to a particular time during the playback of the source 180.

The source dialog stem 184 includes spoken dialog associated with the source 180 and is typically synchronized to the visual component 182. Although not shown, each of the sources 180 may also include any number of additional audio stems, where each audio stem includes any amount of audio content associated with the source 180. For instance, in some embodiments, the source 180(1) may include a special effects audio stem and a music audio stem. Usually, during playback of the source 180, the visual component 182 of the source 180 is displayed on a screen while the source dialog stem 182 and any additional audio stems are output as sounds via any number of audio devices. Examples of audio devices include, without limitation, speakers, headphones, etc.

The source subtitle lists 190 allow viewers who suffer from hearing loss or who do not understand the spoken dialog associated with the source 180 to follow the spoken dialog. Because the sources 180 are typically released in multiple countries and/or one or more multilingual countries, subtitles are typically generated for numerous languages. Each of the source subtitle lists 190 is associated with a different language and includes, without limitation, any number of subtitles (not shown) associated with the language. In the example depicted in FIG. 1, for the source 180(1) "episode 1," the source subtitle list 190(1) includes English subtitles and the source subtitle list 190(N) includes French subtitles.

Each of the subtitles includes, without limitation, text, a subtitle start, and a subtitle end. The text corresponds to a particular portion of the spoken dialog. For each subtitle included in the source subtitle list 190, the subtitle start and the subtitle end designate a source interval during playback of the source 180 when the text is displayed. As referred to herein, a "source time" for the source 180 is a time during the playback of the source 180 relative to the start of the source 180, and a source time interval spans from one sources time to another source time. By contrast, a "trailer time" is a time during the playback of the trailer 120 relative to the start of the trailer 120, and a trailer time interval spans from one trailer time to another trailer time. Further, the source time interval spanning from the start of the playback of the source 180 to the end of the playback of the source 180 is referred to herein as a source timeline associated with the source 180. Similarly, the trailer time interval spanning from the start of the playback of the trailer 120 to the end of the playback of the trailer 120 is referred to herein as a trailer timeline.

The subtitle may specify the subtitle start and the subtitle end in any technically feasible format. For instance, in some embodiments, the subtitle start is specified as a start timecode and the subtitle end is specified as an end timecode. If a viewer requests subtitles, then while the viewer is watching the source visual component 182 on the display screen, the viewer also reads the subtitles included in one of the source subtitle lists 190 displayed in a subtitle area of the display screen.

As shown, the trailer 120 includes, without limitation, a trailer visual component 122, a trailer dialog stem 124, an edit design list (EDL) 130, and any number of trailer subtitles lists 160. In general, the trailer visual component 122 includes, without limitation, any number of visual segments extracted from any number of the source visual components 182. In a complementary fashion, the trailer dialog stem 124 includes, without limitation, any number of audio segments extracted from any number of the source dialog stems 184.

At any given trailer time during the playback of the trailer 120, the trailer visual component 122 and the trailer dialog stem 124 may or may not represent the same source time for a single source 180. For example, at a trailer time of 0:10 (i,e., 0 minutes and 10 seconds) relative to the start of the trailer 120, both the trailer visual component 122 and the trailer dialog stem 124 could correspond to a source time of 10:20 relative to the start of the source 180(2). By contrast, to emphasize a plot twist, at a trailer time of 0:15, the trailer visual component 122 could correspond to a source time of 30:00 for the source 180(1) "episode 1," but the trailer dialog stem 124 could correspond to a source time of 15:05 for the source 180(2) "episode 2."

To facilitate generating the trailer 120, the EDL 130 specifies, without limitation, visual mappings and audio mappings. A visual mapping specifies a mapping between a segment included in one of the source visual components 182 and a segment included in the trailer visual component 122. An audio mapping specifies a mapping between a segment included in one of the source dialog stems 184 and a segment included in the trailer dialog stem 124. In alternate embodiments, the EDL 130 may specify any number and type of additional mappings, and an audio mapping may specify a mapping associated with a different type of audio stems.

The EDL 130 specifies decisions made when generating the trailer 120 based on the sources 180. As shown, the EDL 130 includes, without limitation, any number of edits 140. Each edit 140 specifies a segment included in the audiovisual program 170 from which the audio or visual content of a segment included in the trailer 120 was extracted. For explanatory purposes only, a segment that is associated with the trailer 120 (e.g., is included in the trailer video component 122 or the trailer dialog stem 124) is referred to herein as a "trailer segment." Similarly, a segment that is associated with one of the sources 180 (e.g., is included in one of the source video components 182 or one of the source dialog stems 184) is referred to herein as a "source segment."

As shown, the edit 140 includes, without limitation, a type 142, a trailer start 144, a trailer end 146, a source file 152, a source start 154, and a source end 154. The type 142 specifies a type of the edit 140. For example, the type 142 of "V" specifies that the edit 140 is associated with visual content, the type 142 of "A" specifies that the edit 140 is associated with audio content, and so forth. Each trailer segment included in the trailer video component 122 is associated with a different edit 140 having the type 142 of "V." By contrast, each trailer segment included in the trailer dialog stem 124 is associated with a different edit 140 having the type 142 of "A."

The trailer start 144 specifies a trailer time of the start of a trailer segment, and the trailer end 146 specifies a trailer time of the end of the trailer segment. Consequently, the trailer segment spans a trailer time interval from the trailer start 144 to the trailer end 146. The source file 152 specifies the location and name of a file that includes the corresponding source segment. The source start 154 specifies a source time of the start of the source segment, and the source end 156 specifies a source time of the end of the source segment. Consequently, the source segment spans a source time interval from the source start 154 to the source end 156. For any given edit 140, the length of the target segment equals the length of the source segment.

As persons skilled in the art will recognize, because of the manner in which the EDL 130 is generated, at any given time, certain types of information included in the EDL 130 may be out-of-date. More specifically, for each of the edits 140, the type 142, the trailer start 144, and the trailer end 146 are typically accurate. By contrast, the source file 152 is not necessarily accurate, and timing inaccuracies may be associated with the source start 154 and the source end 156.

For example, suppose that, as a trailer is generated, a trailer editor generates the edit 140 that includes the type 142 "A", the trailer start 144 0:0, the trailer end 146 0:04, the source file 152 "episode5.MP4," the source start 154 25:10 and the source end 156 25:14. Subsequently, episode 4 is canceled and "episode5.MP4" is renamed to "episode4.MP4." Further, as part of providing a smooth transition from episode3 to the new episode4, thirty seconds of additional spoken dialog is inserted at the beginning of episode4.MP4. While the trailer editor properly updates the trailer visual component 122 and the trailer dialog stem 124 to reflect the various changes, the edit 140 is not updated. Consequently, the source file 152, the source start 154, and the source end 156 are inaccurate.

The trailer subtitle lists 160 enable viewers who suffer from hearing loss or who do not understand the spoken dialog associated with the trailer 120 to follow the spoken dialog. Each of the trailer subtitle lists 160 is associated with a different language and includes, without limitation, any number of subtitles associated with the language. As shown, the trailer subtitle list 160(*x*) is associated with the same language as the different source subtitle lists 190(*x*). For the example depicted in FIG. 1, the trailer subtitle list 160(1) and the different source subtitle lists 190(*l*) include English subtitles. In alternate embodiments, the number of trailer subtitle lists 160 may vary from the number of sources subtitle lists 190 associated with a particular source 180, and the number of source subtitle lists 190 associated with the source 180 may vary from the number of source subtitle lists 190 associated with other sources 180.

For each subtitle included in the trailer subtitle list 160, the subtitle start and the subtitle end designate a trailer time interval during playback of the trailer 120 when the associated text is displayed. If a viewer requests subtitles, then while the viewer is watching the trailer visual component 132 on the display screen, the viewer also reads the subtitles included in one of the trailer subtitle lists 160 displayed in a subtitle area of the display screen.

In conventional systems, to expedite the release of a trailer, a trailer editor typically starts to generate the trailer before the source files are finalized. After the trailer is finalized, the trailer subtitles lists are generated. More precisely, for each language, a professional subtitler that is proficient in the language typically views the trailer to manually generate the relevant subtitles. These manual efforts are tedious and time consuming and oftentimes cause delays in releasing the trailers. Among other things, such delays reduce the overall effectiveness of advertising efforts that rely on the trailers. Further, the resulting subtitles for the trailers are often inconsistent with the subtitles for the source files. For instance, the spelling of a character name in the subtitle for a trailer may be different than the spelling of the character name in the corresponding subtitle for the corresponding source.

Generating Subtitles for Trailers

To reduce the time and manual effort involved in generating accurate trailer subtitle lists 160 as well as to ensure that the trailer subtitle lists 160 are consistent with the corresponding source files lists 190, the system 100 includes, without limitation, a subtitle application 130. As shown, the subtitle application 130 executes on the processor 112 and is stored in the memory 116. In general, the subtitle application 130 automatically generates the subtitle lists 160 based on the EDL 130, the trailer dialog stem 124, the source dialog stems 184, and the source subtitles lists 190.

For each of the edits 140 of type "A" included in the EDL 130, the subtitle application 130 identifies a corresponding trailer segment included in the trailer dialog stem 124 based on the trailer start 144 and the trailer end 146. Notably, as described in greater detail in conjunction with FIG. 2, the subtitle application 130 does not rely on the unreliable specifications of the source files 152, the source starts 154, and the source ends 154 included in the edits 140. Instead, for each trailer segment, the subtitle application 120 performs audio comparison operations between the trailer segment and source segments included in the various source dialog stems 184 to determine a matching source segment.

Subsequently, for each language, the subtitle application 130 generates the trailer subtitle list 160 based on the matching source segments and the source subtitle lists 190. In this fashion, the subtitle application 130 enables a user to efficiently and automatically generate the trailer subtitle lists 160 that accurately reflect the trailer dialog stem 124 and are consistent with the corresponding source subtitles lists 190. For explanatory purposes only, a "user" refers to any person that performs operations via the trailer application 130. Examples of users include, without limitation, a trailer editor and a subtitler.

It will be appreciated that the system 100 shown herein is illustrative and that variations and modifications are possible. For example, the functionality provided by the subtitle application 130 as described herein may be integrated into or distributed across any number of software applications (including one) and any number of components of the system 100. Further, the connection topology between the various units in the system 100 may be modified as desired.

Note that the techniques described herein are illustrative rather than restrictive, and may be altered without departing from the broader spirit and scope of the invention. In general, the scope of the invention includes any techniques for generating subtitles for trailers based on audio comparison operations between trailer segments and source segments. Many modifications and variations will be apparent to those of ordinary skill in the art without departing from the scope and spirit of the described embodiments and techniques. For instance, in some alternate embodiments, instead of automatically generating all of the subtitles included in the trailer subtitle lists 160, the subtitle application 130 may automatically generate any number of the subtitles and interact with the user to generate the remaining subtitles.

Figure 2:
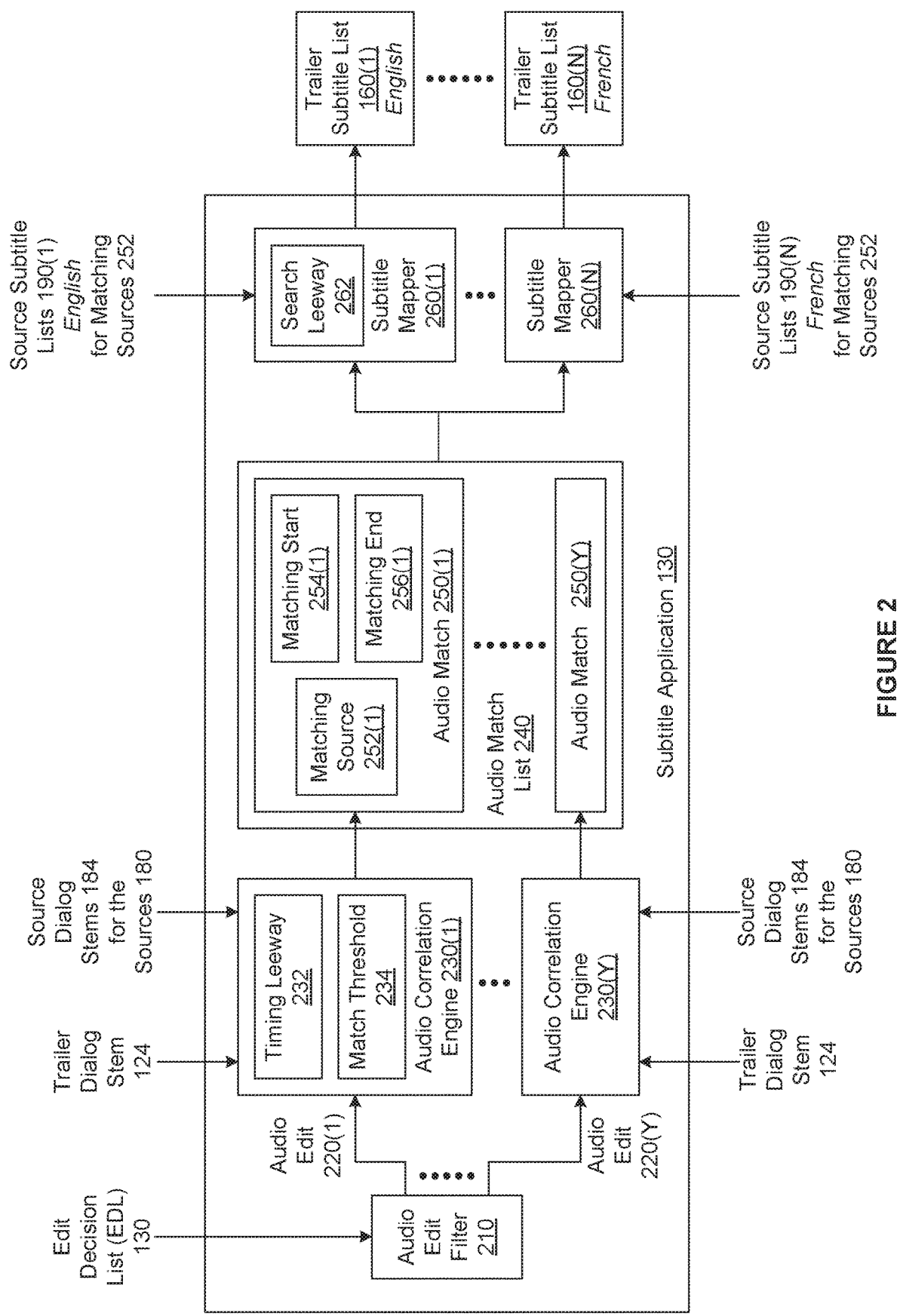
FIG. 2 is a more detailed illustration of the subtitle application of FIG. 1, according to various embodiments of the present invention.

FIG. 2 is a more detailed illustration of the subtitle application 130 of FIG. 1, according to various embodiments of the present invention. As shown, the subtitle application 130 includes, without limitation, an audio edit filter 210, an audio correlation engine 230, and a subtitle mapper 260.

The audio edit filer 210 receives the EDL 130 and filters the edits 140 based on the type 142 to determine the audio edits 220. For each of the trailer segments included in the trailer dialog stem 124, a different audio edit 220 specifies a source segment included in one of the source dialog stems 184. As described in conjunction with FIG. 1, because of the manner in which the EDL 130 is generated, for each of the audio edits 220, the type 142, the trailer start 144, and the trailer end 146 are typically accurate. By contrast, the source file 152 is not necessarily accurate, and timing inaccuracies may be associated with the source start 154 and the source end 156.

Each of the audio edits 220 is one of the inputs to a different instance of the audio correlation engine 230. In general, the audio correlation engine 230(*x*) evaluates the audio edit 220(*x*), the trailer dialog stem 124, and any number of the source dialog stems 184 to identify an audio match 250(*x*) between a trailer segment and a source segment. The audio correlation engine 230 includes, without limitation, a timing leeway 232 and a match threshold 234.

Upon receiving the audio edit 220, the audio correlation engine 230 identifies a trailer segment included in the trailer dialog stem 124 based on the trailer start 144 and the trailer end 146. The trailer segment spans from the trailer start 144 to the trailer end 146 within the trailer timeline. Because the source file 152 is often inaccurate, the audio correlation engine 230 disregards the source file 152. The timing leeway 232 specifies a maximum timing inaccuracy that is to be mitigated for the source start 154 and the source end 156. For instance, in some embodiments, the timing leeway 232 is 10 seconds. Accordingly, the start of the source segment that matches the trailer segment is within 10 seconds of the source start 154, and the end of the source segment is within 10 seconds of the source end 156.

The audio correlation engine 230 then sequentially selects and evaluates each of the source dialog stems 184 until the audio correlation engine 230 identifies a source segment included in the selected source dialog stem 184 that matches the trailer segment, in alternate embodiments, instead of disregarding the source file 152, the audio correlation engine 230 may select the source file 152 as the first source dialog stem 184 to evaluate.

To evaluate the selected source dialog stem 184, the audio correlation engine 230 identifies a test segment included in the source dialog stem 184. The test segment spans from (the source start 154–the timing leeway 232) to (the source end 156+the timing leeway 234) within the source timeline of the source dialog stem 184. The audio correlation engine 230 then computes a normalized cross-correlation (not shown in FIG. 2) between the trailer segment and the test segment. The audio correlation engine 230 may compute the normalized cross-correlation in any technically feasible fashion.

For instance, in some embodiments, the audio correlation engine 230 may compute the cross-correlation between the trailer segment and the test segment with no normalization as follows:

$$\hat{R}_{xy}(m) = \begin{cases} \sum_{n=0}^{N-m-1} x_{n+m} y_n^*, & m \geq 0, \\ \hat{R}_{yx}^*(-m), & m < 0. \end{cases} \quad (1)$$

To generate the normalized cross-correlation between the trailer segment and the test segment, at every step, the audio correlation engine 230 may modify equation (1) to include additional divisors (e.g., the standard deviation and the length of the trailer segment).

In alternate embodiments, to reduce the time required to compute the cross-correlation between the trailer segment and the test segment, the auto correlation engine 230 may perform Fourier transforms to transform the trailer segment and the test segment to the frequency domain. The auto correlation engine 230 may then compute the cross-correlation in the frequency domain and perform an inverse Fourier transform on the result to transform the result into the original time domain.

After generating the normalized cross-correlation, the audio correlation engine 230 identifies the time lag for which the normalized cross-correlation is maximized. Accordingly, the time lag specifies a time relative to the start of the test segment at which the audio content of the test segment is best aligned to the trailer segment. Consequently, the "best matching" segment within the test segment starts at the time lag and has a length equal to the length of the trailer segment. For instance, suppose that the length of the trailer segment is 3 seconds and the test segment spans from 9:55 to 10:18 along a source timeline. If the maximum of the normalized cross-correlation is at a time of 12 seconds with respect to the test segment, then the time lag is 12 seconds and the best matching segment spans from 10:07 to 10:10 along the source timeline.

The audio correlation engine 230 then computes a match strength associated with the best matching segment based on the cross-correlation. The match strength indicates a level of audio similarity between the source segment and the best matching segment. The audio correlation engine 230 computes the match strength for the best matching segment based on the length and energy of the normalized cross-correlation coefficient (e.g., the value of the left hand side of equation (1)) corresponding to the best matching segment.

Subsequently, the audio correlation engine 230 compares the match strength to the match threshold 234. If, the match strength does not exceed the match threshold 234, then the audio correlation engine 230 determines that the selected source dialog stem 184 does not include a match for the trailer segment. The audio correlation engine 230 then selects another source dialog stem 184 and attempts to identify a match for the trailer segment within the newly selected source dialog stem 184.

If, however, the match strength exceeds the match threshold 234, then the audio correlation engine 230 determines that the best matching segment included in the test segment is a match for the trailer segment. The audio correlation engine 230 then generates the audio match 250 for the trailer segment. The audio match 250 includes, without limitation, a matching source 252, a matching start 254, and a matching end 256. The audio correlation engine 230 sets the matching source 252 equal to the source 180 associated with the selected source dialog stem 184, the matching start 254 equal to the source time at the start of the best matching segment, and the matching end 256 equal to the source time at the end of the best matching segment. For explanatory purposes only, the source segment corresponding to the audio match 250 is also referred to herein as the "matching source segment."

The audio correlation engine 230 then adds the audio match 250 to an audio match list 240, As shown, the audio match list 240 includes, without limitation, a different audio match 250 for each trailer segment, where each audio match 250 is generated by a different instance of the audio correlation engine 230 for each trailer segment. After adding the audio match 250 to the audio match list 240, the correlation engine 230 has finished evaluating the trailer segment and does not perform matching operations between the trailer segment and any remaining source dialog stems 184.

After evaluating all of the source dialog stems 184, if the audio correlation engine 230 is unable to identify any source segments having a match strength that exceeds the match threshold 234, then the audio correlation engine 230 determines the best of the best matching segments. More precisely, the audio correlation engine 230 compares the match strengths of the different best matching segments associated with the different source dialog stems 184. The audio correlation engine 230 then generates the audio match 250 based on the best matching segment having the highest match strength. Finally, the audio correlation engine 230 adds the audio match 250 to the match list 240.

In alternate embodiments, the audio correlation engine 230 may interact with the user to determine any number of the audio matches 250. For instance, in some embodiments, the audio correlation engine 230 may display an error message when the match strength associated with the best of the best matching segments is less than the match threshold 234. The audio correlation engine 230 may then interact with the user to determine the audio match 250.

In various embodiments, the audio correlation engine 230 may identify the audio match 250 for the trailer segment in any technically feasible fashion. In general, the audio correlation engine 230 may perform any number of matching operations as part of template matching. Template matching refers to a technique in digital signal processing for finding a small part of an audio that matches a template audio. The cross-correlation based technique described previously herein is one example of a template matching technique.

After the audio correlation engine 230 generates the audio matches 250 for all of the trailer segments, the subtitler mapper 260 generates the trailer subtitle lists 160. More precisely, for each language, a different instance of the subtitler mapper 260 generates the trailer subtitle list 160 associated with the language based on the match list 240 and the source subtitle lists 190 associated with the language. In the example depicted in FIG. 2, the subtitle mapper 260(1) generates the trailer subtitle list 160(1) associated with English based on the match list 240 and the source subtitle lists 190(1) associated with English. By contrast, the subtitle mapper 260(N) generates the trailer subtitle list 160(N) associated with French based on the match list 240 and the source subtitle lists 190(N) associated with French.

As shown, the subtitler mapper 260 includes, without limitation, a search leeway 262. As persons skilled in the art will recognize, subtitles are typically generated to comply with a variety of subtitle guidelines, such as a maximum reading speed, and minimum frame gap or minimum time gap between different subtitles. Consequently, the start and end of a subtitle associated with the matching source segment specified by the audio match 250 do not necessarily lie between the matching start 254 and the matching end 256. For a particular language, to find the subtitles associated with the matching source segment, the subtitle mapper 260 computes a search interval that spans from (the matching start 254–the search leeway 262) to the (matching end 256+the search leeway 262). Subsequently, the subtitle mapper 260 searches the source subtitle list 190 associated with the matching source 252 and the language to identify all the subtitles included in the search interval.

For each identified subtitle, the subtitle mapper 260 performs mapping operations on the subtitle to generate a mapped subtitle. In operation, the subtitler mapper 260 maps the subtitle start and subtitle end specified in the subtitle from the source timeline to the trailer timeline based on the associated trailer segment and the matching source segment. For instance, suppose that the trailer segment spans from the trailer start 144 of 0:00 to the trailer end 146 of 0:03. Further, suppose that the matching source segment spans from the matching start 254 of 10:07 to the matching end 256 of 0:10. Finally, suppose that an identified subtitle spans from the source time of 10:09 to 10:15.

In such a scenario, the subtitle mapper 260 would compute that an offset between the trailer start 133 and the matching start 254 is equal to 10:07. Subsequently, the subtitle mapper 260 would subtract the offset from the subtitle start of 10:09 in the source timeline to compute the subtitle start of 0:02 in the trailer timeline. Similarly, the subtitle mapper 260 would subtract the offset from the subtitle end of 10:15 in the source timeline to compute the subtitle end of 0:08 in the trailer timeline. Finally, the subtitle mapper 260 would generate a mapped subtitle that includes the same text as the identified subtitle, a subtitle start of 0:02, and a subtitle end of 0:08.

After generating mapped subtitle(s) for the audio matches 250 and, consequently, the trailer segments, the subtitler mapper 260 generates the trailer subtitle list 160 that includes, without limitation, the mapped subtitles. In some embodiments, as part of generating the trailer subtitle list 160 the subtitler mapper 260 may modify the time interval associated with one or more mapped subtitles to comply with any number of subtitle guidelines. For example, if the time between a mapped subtitle associated with one trailer segment and a mapped subtitle associated with another trailer segment is less than a minimum time gap between subtitles, then the subtitle mapper 260 may modify the times associated with one or both of the mapped subtitles.

It will be appreciated that the subtitle application 130 shown herein is illustrative and that variations and modifications are possible. For example the functionality provided by the audio edit filter 210, the audio correlation engine 230, and the subtitle mapper 260 may be integrated into or distributed across any number of software applications (including one) and any number of components of the system 100.

Note that the techniques described herein are illustrative rather than restrictive, and may be altered without departing from the broader spirit and scope of the invention. For instance, in some embodiments, many modifications and variations will be apparent to those of ordinary skill in the art without departing from the scope and spirit of the described embodiments and techniques. As a general matter, the techniques outlined herein are applicable to generating subtitles for a trailer based on performing matching operations between audio associated with the trailer and any number of audios associated with any number of sources.

Identifying Audio Matches Between Trailer Segments and Source Segments

Figure 3:
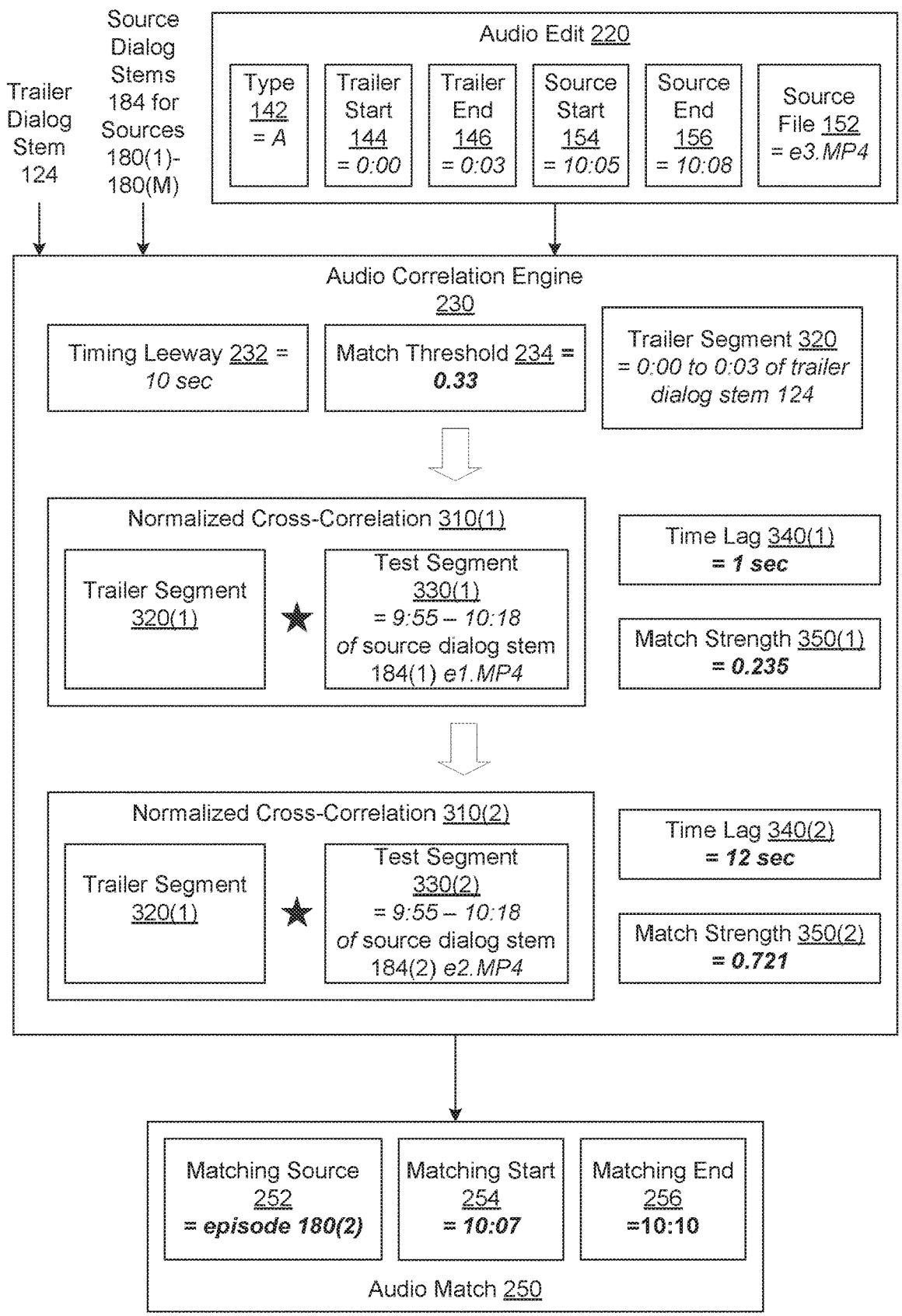
FIG. 3 illustrates a sequence of operations performed by the audio correlation engine of FIG. 2 when identifying an audio match, according to various embodiments of the present invention.

FIG. 3 illustrates a sequence of operations performed by the audio correlation engine 230 of FIG. 2 when identifying the audio match 250, according to various embodiments of the present invention. As shown, the timing leeway 232 equals 10 seconds and the match threshold 234 equals 0.33. The timing leeway 232 and the match threshold 234 may be determined in any technically feasible fashion. For instance, in some embodiments, the user may specified the timing leeway 232 via a user interface and the match threshold 234 may be a constant that is heuristically estimated based on a validation dataset.

Upon receiving the audio match 250, the audio correlation engine 230 identifies a trailer segment 320. Because the trailer start 144 equals 0:00 and the trailer end 146 equals 0:03, the audio correlation engine 230 identifies the portion of the trailer dialog stem 124 spanning from 0:00 to 0:03 as the trailer segment 320.

The audio correlation engine 230 then disregards the source file 152 "e3.MP4," and selects the source dialog stem 184(1) "e1.MP4" associated with the source 180(1) "episode 1." Since the source start 154 equals 10:05, the source end equals 10:08, and the timing leeway 232 equals 10 seconds, the audio correlation engine 230 identifies the portion of the source dialog stem 184(1) spanning from 9:55 to 10:18 as a test segment 330(1). The audio correlation engine 230 then computes the cross-correlation 310(1) between the trailer segment 320 and the test segment 330(1).

Subsequently, the audio correlation engine 230 sets a time lag 340(1) to a time of 1 second for which the normalized cross-correlation 310(1) is maximized. As described in conjunction with FIG. 2, the time lag 340(1) defines the best matching segment included in the test segment 330(1). The audio correlation 230 computes a match strength 250(1) of 0.235 for the best matching segment based on the length and energy of the normalized cross-correlation coefficient corresponding to the best matching segment.

Because the match strength 250(1) does not exceed the match threshold 234, the audio correlation engine 230 selects the source dialog stem 184(2) "e2.MP4" associated with the source 180(2) "episode 2." The audio correlation engine 230 identifies the portion of the source dialog stem 184(2) spanning from 9:55 to 10:18 as a test segment 330(2). The audio correlation engine 230 then computes the cross-correlation 310(2) between the trailer segment 320 and the test segment 330(2). Subsequently, the audio correlation engine 230 determines that the time lag 340(2) is equal to 12 seconds and computes a match strength 250(2) of 0.721.

Because the match strength 250(2) exceeds the match threshold 234, the audio correlation engine 230 then generates the match 250. As shown, the audio correlation engine 230 sets the matching source 252 equal to the source 180(2) "episode 2," the matching start 252 equal to 10:07 and the matching end 254 equal to 10:10. Notably, the source dialog stem 184(2) associated with the matching source 252 does not equal the source file 152 specified in the audio edit 220. Further, the matching start 252 does not match the source start 152 and the matching end 254 does not match the source end 254.

As illustrated by this example, the audio correlation engine 230 correctly identifies the matching source segment corresponding to the trailer segment 320 despite the presence of errors in the audio edit 220. Consequently, unlike conventional approaches for generating subtitles for trailers, the subtitle application 130 accurately generates the trailer subtitle lists 160 when the EDL 130 includes errors without requiring professional subtitlers to view the trailer 120.

Figure 4A:
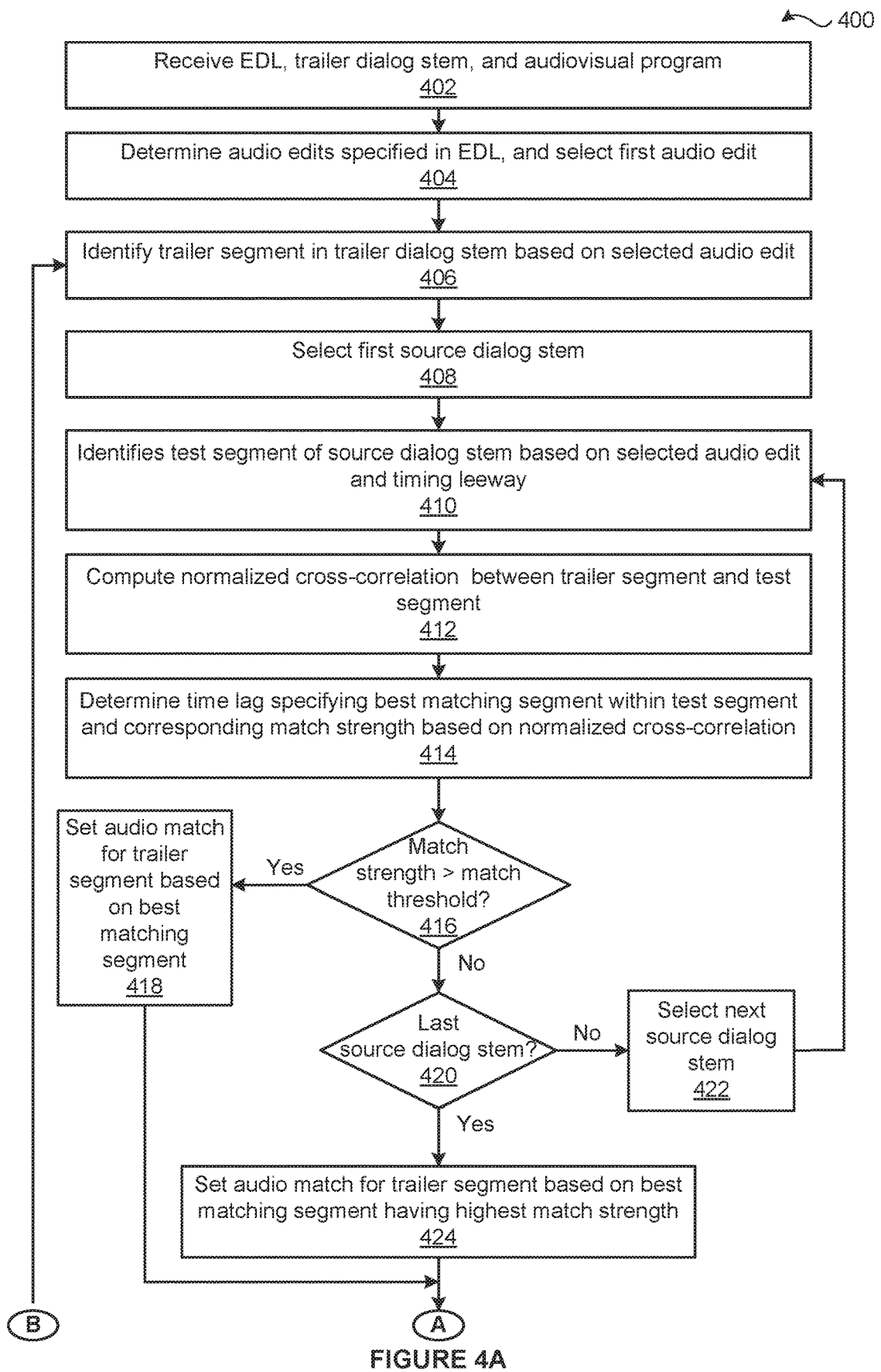
FIGS. 4A-4B set forth a flow diagram of method steps for generating subtitles for a trailer, according to various embodiments of the present invention.
Figure 4B:
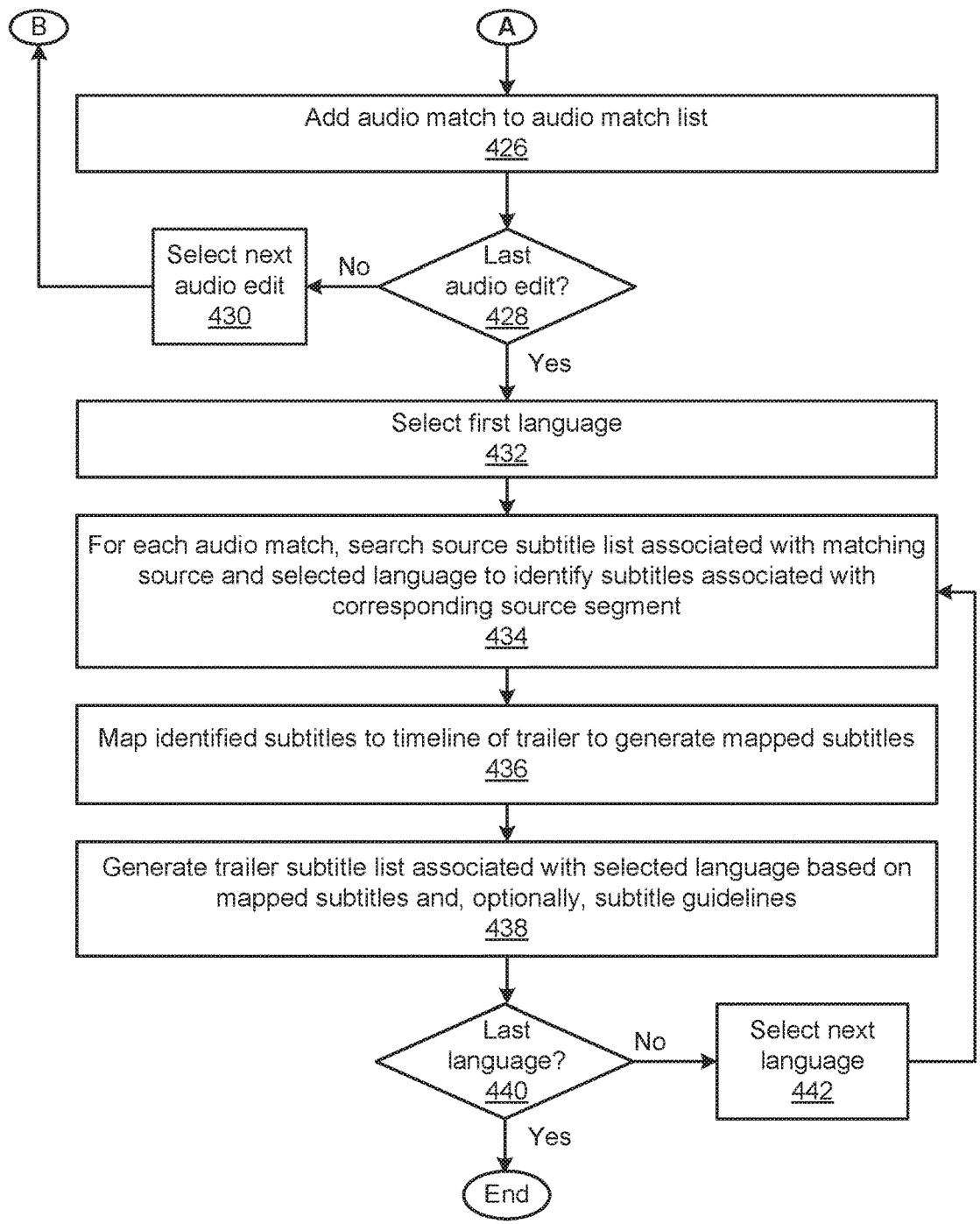

FIGS. 4A-4B set forth a flow diagram of method steps for generating subtitles for a trailer, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the subtitle application 130 receives the EDL 130, the trailer dialog stem 124, and the audiovisual program 170. At step 404, the audio edit filter 120 determines the audio edits 220 included in the EDL 130 based on the type 142, and the subtitle application 130 selects a first audio edit 220. At step 406, the audio correlation engine 230 identifies the trailer segment 320 included in the trailer dialog stem 124 based on the trailer start 144 and the trailer end 146 specified in the selected audio edit 220. At step 408, the audio correlation engine 230 selects the first source dialog stem 184 associated with the audiovisual program 170.

At step 410, the audio correlation engine 230 identifies the test segment 330 included in the selected source dialog stem 184 based on the source start 154 and the source end 156 specified in the selected audio edit 220 in conjunction with the timing leeway 232. At step 412, the audio correlation engine 230 computes the normalized cross-correlation 310 between the trailer segment 320 and the test segment 330. At step 414, based on the normalized cross-correlation 310, the audio correlation engine 230 determines the time lag 420 specifying the best matching segment included in the test segment 330 and the corresponding match strength 350.

At step 416, the audio correlation engine 230 determines whether the match strength 350 exceeds the match threshold 234. If, at step 416, the audio correlation engine 230 determines that the match strength 350 exceeds the match threshold 234, then the method 400 proceeds to step 418. At step 418, the audio correlation engine 230 sets the audio match 250 associated with the trailer segment 320 based on the best matching segment included in the test segment 330. More specifically, the audio correlation engine 230 sets the matching source 252 equal to the source 180 associated with the selected source dialog stem 184. Further, the audio correlation engine 230 sets the matching start 254 and the matching end 256 based on, respectively, the start and end of the best matching segment. The method 400 then proceeds directly to step 426.

If, however, at step 416, the audio correlation engine 230 determines that the match strength 350 does not exceed the match threshold 234, then the method 400 proceeds directly to step 420. At step 420, the audio correlation engine 230 determines whether the selected source dialog stem 184 is the last source dialog stem 184 associated with the audiovisual program 170.

If, at step 420, the audio correlation engine 230 determines that the selected source dialog stem 184 is not the last source dialog stem 184 associated with the audiovisual program 170, then the method 400 proceeds to step 422. At step 422, the audio correlation engine 230 selects the next source dialog stem 184 associated with the audiovisual program 170. The method 400 then returns to step 410, where the audiovisual program 170 generates and evaluates a new test segment 330 based on the newly selected source dialog stem 184.

If, however, at step 420, the audio correlation engine 230 determines that the selected source dialog step 184 is the last source dialog stem 184 associated with the audiovisual program 170, then the method 400 proceeds directly to step 424. At step 422, the audio correlation engine 230 generates the audio match 250 associated with the trailer segment 320 based on the best matching segment having the highest match strength 350. More precisely, the audio correlation engine 230 compares the match strengths 350 associated with the different best matching segments included in the different source dialog stems 184. The audio correlation engine 230 then selects the best matching segment associated with the highest match strength 350.

Subsequently, the audio correlation engine 230 sets the matching source 252 equal to the source 180 associated with the source dialog stem 184 that includes the selected best matching segment. Further, the audio correlation engine 230 sets the matching start 254 and the matching end 256 based on, respectively, the start and end of the selected best matching segment.

At step 426, the audio correlation engine 230 adds the audio match 250 to the audio list 240. At step 428, the subtitle application 130 determines whether the selected audio edit 220 is the last audio edit 220 included in the EDL 130. If, at step 428, the subtitle application 130 determines that the audio edit 220 is not the last audio edit 220 included in the EDL 130, then the method 400 proceeds to step 430. At step 430, the subtitle application 130 selects the next audio edit 220 included in the EDL 130. The method 400 then returns to step 406 where the audio correlation engine 230 identifies a new trailer segment 320 and the associated audio match 250.

If, however, at step 428, the subtitle application 130 determines that the audio edit 220 is the last audio edit 220 included in the EDL 130, then the method 400 proceeds directly to step 432. At step 432, the subtitle application 130 selects the first language for which subtitles are to be generated. At step 434, for each of the audio matches 250 included in the audio match list 240, the subtitle mapper 260 identifies any number of subtitles associated with the matching source segment. The subtitle mapper 250 computes a search interval that spans from (the matching start 254−the search leeway 262) to the (matching end 256+the search leeway 262). Subsequently, the subtitle mapper 260 searches the source subtitle list 190 associated with the matching source 252 and the language to identify all the subtitles included in the search interval.

At step 436, the subtitle mapper 260 maps the identified subtitles to the trailer timeline to generate mapped subtitles. For each of the identified subtitles, the subtitler mapper 260 maps the subtitle start and subtitle end specified in the subtitle from the associated source timeline to the trailer timeline based on the associated trailer segment 320 and the matching source segment. Notably, for each identified subtitle, the subtitle mapper 260 generates a mapped subtitle that includes the same text as the identified subtitle.

At step 438, the subtitle mapper 260 generates the trailer subtitle list 160 associated with the selected language based on the mapped subtitles and, optionally, any number of subtitle guidelines. At step 440, the subtitle application 130 determines whether the selected language is the last language for which subtitles are to be generated. If, at step 440, the subtitle application 130 determines that the selected language is not the last language for which subtitles are to be generated, then the method 400 proceeds to step 442. At step 442, the subtitle application 130 selects the next language for which subtitles are to be generated. The method 400 then returns to step 434, where the subtitle mapper 260 generates the trailer subtitle list 160 associated with the newly selected language.

If, however, at step 440, the subtitle application 130 determines that the selected language is the last language for which subtitles are to be generated, then the method 400 terminates. Advantageously, because the subtitle application 130 disregards the source files 152 and mitigates any timing errors associated with the source starts 154 and the source ends 156, the subtitle application 130 automatically generates accurate trailer subtitle lists 160 while minimizing human intervention.

In sum, the disclosed techniques may be used to automatically generate subtitles for trailers. A subtitle application includes, without limitation, an audio edit filter, an audio correlation engine, and a subtitle mapper. The audio edit filter identifies the audio edits included in an edit decision list (EDL). For each audio edit, the audio correlation engine identifies a trailer segment included in a trailer dialog stem based on the trailer start and end times specified in the audio edit. The audio correlation engine then evaluates source dialog stems for different sources (e.g., episodes) associated with an audiovisual program until the audio correlation engine identifies an audio match to the audio segment. The audio match specifies, without limitation, a matching source and a matching time interval within the matching source.

More specifically, for a particular source, the audio correlation engine identifies a test segment included in a corresponding source dialog stem based on the source start and end times specified in the audio edit and a timing leeway (e.g., +/−10 seconds). Subsequently, the audio correlation engine computes a cross-correlation between the trailer segment and the test segment. The maximum value of the cross-correlation corresponds to a time lag associated with the greatest similarity between the trailer segment and the test segment.

If the match strength associated with the cross-correlation and the time lag is greater than a match threshold, then the audio correlation engine generates a match that specifies the source and a matching source segment corresponding to the time lag. Otherwise, the audio correlation engine evaluates a source dialog stem that the audio correlation engine has not yet evaluated. If the audio correlation engine has evaluated all the source dialog stems associated with the audiovisual program, then the audio correlation engine sets the audio match based on the test segment and the time lag associated with the highest match strength.

After the audio correlation engine determines audio matches for all of the trailer segments, the subtitle mapper generates a different trailer subtitle list for each language. For a particular language and a particular audio match, the subtitle mapper identifies an existing subtitle list based on the matching source and the language. The subtitle mapper then identifies subtitles included in the identified subtitle list based on the matching time interval and a search leeway. Subsequently, the subtitle mapper maps the subtitle starts and the subtitle ends specified in the identified subtitles to the timeline of the trailer to generate mapped subtitles associated with the language. For each language, after generating the mapped subtitles associated with the language for all the audio matches, the subtitle mapper assembles the mapped subtitles into a trailer subtitle list.

Advantageously, by generating subtitles for trailers based on audio edits, audio matching operations, and subtitles lists for sources, the subtitle application ensures that each of the subtitles is accurate and consistent with the corresponding subtitle for the corresponding source. The technological improvement relative to the prior art is that the disclosed techniques use automated audio comparisons to identify the corresponding source and the relevant subtitles. As a result, for each audio edit, instead of relying on the potentially inaccurate identification of the corresponding source specified in the audio edit, the subtitle application correctly identifies the corresponding source. Further, the timing leeway mitigates inaccuracies of source times specified in the audio edit. In general, unlike conventional approaches to generating subtitles for trailers, professional subtitles do not need to view the finalized trailer to generate accurate subtitles. Consequently, both the manual effort associated with generating subtitles for trailers and the likelihood that generating the subtitles delays the release of a trailer are decreased.

1. In some embodiments, a computer-implemented method comprises performing one or more matching operations between a trailer audio associated with a trailer and a first source audio associated with an audiovisual program to determine that a first segment of the trailer audio corresponds to a second segment of the first source audio; mapping a first subtitle associated with the first source audio from a source timeline associated with the first source audio to a trailer timeline associated with the trailer audio to generate a first mapped subtitle; and generating a trailer subtitle list based on the first mapped subtitle and at least one additional mapped subtitle.

2. The computer-implemented method of clause 1, wherein performing the one or more matching operations comprises computing a cross-correlation between the first segment of the trailer audio and a third segment of the first source audio, wherein the third segment of the first source audio includes the second segment of the first source audio; identifying the second segment of the first source audio based on the cross-correlation; computing a match strength based on the cross-correlation; and determining that the first segment of the trailer audio corresponds to the second segment of the first source audio based on the match strength.

3. The computer-implemented method of clauses 1 or 2, further comprising determining the third segment of the first source audio based on at least one of a trailer source time specified in an audio edit, a trailer end time specified in the audio edit, and a timing leeway.

4. The computer-implemented method of any of clauses 1-3, further comprising, prior to performing the one or more matching operations, determining that the first segment of the trailer audio does not correspond to any segment of a second source audio associated with the audiovisual program.

5. The computer-implemented method of any of clauses 1-4, wherein the second source audio comprises spoken dialog for a first episode of the audiovisual program, and the first source audio comprises spoken dialog for a second episode of the audiovisual program.

6. The computer-implemented method of any of clauses 1-5, further comprising, prior to performing the one or more matching operations, identifying the first segment of the trailer audio based on an audio edit included in an edit decision list associated with the trailer.

7. The computer-implemented method of any of clauses 1-6, further comprising, identifying the first subtitle based a time interval associated with the second segment of the first source audio and a subtitle list associated with the first source audio.

8. The computer-implemented method of any of clauses 1-7, wherein mapping the first subtitle comprises determining an offset between a first start time of the first segment of the trailer audio relative to the trailer timeline and a second start time of the second segment of the first source audio relative to the source timeline; and modifying both a subtitle start time included in the first subtitle and a subtitle end time included in the first subtitle based on the offset.

9. The computer-implemented method of any of clauses 1-8, wherein the at least one additional mapped subtitle comprises a second mapped subtitle associated with the first segment of the trailer audio.

10. In some embodiments, a computer-readable storage medium includes instructions that, when executed by a processor, cause the processor to perform the steps of identifying an audio match between a first segment of a trailer audio associated with a trailer and a second segment of a first source audio associated with an audiovisual program; mapping a first subtitle associated with the first source audio from a source timeline associated with the first source audio to a trailer timeline associated with the trailer audio to generate a first mapped subtitle; and generating a trailer subtitle list based on the first mapped subtitle and at least one additional mapped subtitle.

11. The computer-readable storage medium of clause 10, wherein identifying the audio match comprises computing a cross-correlation between the first segment of the trailer audio and a third segment of the first source audio, wherein the third segment of the first source audio includes the second segment of the first source audio; identifying the second segment of the first source audio based on the cross-correlation; computing a match strength based on the cross-correlation; and determining that the first segment of the trailer audio corresponds to the second segment of the first source audio based on the match strength.

12. The computer-readable storage medium of clauses 10 or 11, further comprising determining the third segment of the first source audio based on at least one of a trailer source time specified in an audio edit, a trailer end time specified in the audio edit, and a timing leeway.

13. The computer-readable storage medium of any of clauses 10-12, further comprising, prior to identifying the audio match, determining that the first segment of the trailer audio does not correspond to any segment of a second source audio associated with the audiovisual program.

14. The computer-readable storage medium of any of clauses 10-13, wherein the second source audio comprises spoken dialog for a first episode of the audiovisual program, and the first source audio comprises spoken dialog for a second episode of the audiovisual program.

15. The computer-readable storage medium of any of clauses 10-14 further comprising, prior to identifying the audio match, identifying the first segment of the trailer audio based on an audio edit included in an edit decision list associated with the trailer.

16. The computer-readable storage medium any of clauses 10-15, wherein the at least one additional mapped subtitle comprises a second mapped subtitle associated with a different segment of the trailer audio.

17. The computer-readable storage medium of any of clauses 10-16, wherein generating the trailer subtitle list comprises determining that the first mapped subtitle does not comply with a subtitle guideline; modifying the first mapped subtitle based on the subtitle guideline to generate a first compliant subtitle; and aggregating the first compliant subtitle and the at least one additional mapped subtitle to generate at least a portion of the trailer subtitle list.

18. The computer-readable storage medium of any of clauses 10-17, wherein the subtitle guideline specifies at least one of a minimum frame gap and a minimum time gap between subtitles.

19. In some embodiments, a system comprises a memory storing instructions; and a processor that is coupled to the memory and, when executing the instructions, is configured to perform one or more matching operations between a trailer audio associated with a trailer and a first source audio to determine that a first segment of the trailer audio does not corresponds to any segment of the first source audio, wherein the first source audio and a second source audio are included in a plurality of source audios associated with an audiovisual program; perform one or more matching operations between the trailer audio and the second source audio to determine that the first segment of the trailer audio corresponds to a second segment of the second source audio; map a first subtitle associated with the second source audio from a source timeline associated with the second source audio to a trailer timeline associated with the trailer audio to generate a first mapped subtitle; and generate a trailer subtitle list based on the first mapped subtitle and at least one additional mapped subtitle.

20. The system of clause 19, wherein the instructions configure to processor to perform the one or more matching operations between the trailer audio and the second source audio by computing a cross-correlation between the first segment of the trailer audio and a third segment of the second source audio, wherein the third segment of the second source audio includes the second segment of the second source audio; identifying the second segment of the second source audio based on the cross-correlation; computing a match strength based on the cross-correlation; and determining that the first segment of the trailer audio corresponds to the second segment of the second source audio based on the match strength.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   performing one or more matching operations between an audio file associated with a sequence of segments of an audiovisual program and a first source audio associated with the audiovisual program to determine that a first segment of the audio file corresponds to a second segment of the first source audio;
   in response to determining that the first segment of the audio file corresponds to the second segment of the first source audio, mapping a first subtitle associated with the second segment of the first source audio from a source timeline associated with the first source audio to a portion of a timeline associated with the first segment of the audio file to generate a first mapped subtitle; and
   generating a subtitle list based on the first mapped subtitle and at least one additional mapped subtitle.

2. The computer-implemented method of claim 1, wherein performing the one or more matching operations comprises:
   computing a cross-correlation between the first segment of the audio file and a third segment of the first source audio, wherein the third segment of the first source audio includes the second segment of the first source audio;
   identifying the second segment of the first source audio based on the cross-correlation;
   computing a match strength based on the cross-correlation; and
   determining that the first segment of the audio file corresponds to the second segment of the first source audio based on the match strength.

3. The computer-implemented method of claim 2, further comprising determining the third segment of the first source audio based on at least one of a source time specified in an audio edit, an end time specified in the audio edit, and a timing leeway.

4. The computer-implemented method of claim 1, further comprising, prior to performing the one or more matching operations, determining that the first segment of the audio file does not correspond to any segment of a second source audio associated with the audiovisual program.

5. The computer-implemented method of claim 4, wherein the second source audio comprises spoken dialog for a first episode of the audiovisual program, and the first source audio comprises spoken dialog for a second episode of the audiovisual program.

6. The computer-implemented method of claim 1, further comprising, prior to performing the one or more matching operations, identifying the first segment of the audio file based on an audio edit included in an edit decision list associated with the sequence of segments of the audiovisual program.

7. The computer-implemented method of claim 1, further comprising, identifying the first subtitle based on a time interval associated with the second segment of the first source audio and a subtitle list associated with the first source audio.

8. The computer-implemented method of claim 1, wherein mapping the first subtitle comprises:
   determining an offset between a first start time of the first segment of the audio file relative to the timeline associated with the audio file and a second start time of the second segment of the first source audio relative to the source timeline; and
   modifying both a subtitle start time included in the first subtitle and a subtitle end time included in the first subtitle based on the offset.

9. The computer-implemented method of claim 1, wherein the at least one additional mapped subtitle comprises a second mapped subtitle associated with the first segment of the audio file.

10. One or more non-transitory computer-readable storage media including instructions that, when executed by one or more processors, cause the one or more processors to perform the steps of:
   identifying an audio match between a first segment of an audio file associated with a sequence of segments of an audiovisual program and a second segment of a first source audio associated with the audiovisual program;
   in response to identifying the audio match between the first segment of the audio file and the second segment of the first source audio, mapping a first subtitle associated with the second segment of the first source audio from a source timeline associated with the first source audio to a portion of a timeline associated with the first segment of the audio file to generate a first mapped subtitle; and
   generating a subtitle list based on the first mapped subtitle and at least one additional mapped subtitle.

11. The one or more non-transitory computer-readable storage media of claim 10, wherein identifying the audio match comprises:
   computing a cross-correlation between the first segment of the audio file and a third segment of the first source audio, wherein the third segment of the first source audio includes the second segment of the first source audio;
   identifying the second segment of the first source audio based on the cross-correlation;
   computing a match strength based on the cross-correlation; and
   determining that the first segment of the audio file corresponds to the second segment of the first source audio based on the match strength.

12. The one or more non-transitory computer-readable storage media of claim 11, further comprising determining the third segment of the first source audio based on at least one of a source time specified in an audio edit, an end time specified in the audio edit, and a timing leeway.

13. The one or more non-transitory computer-readable storage media of claim 10, further comprising, prior to identifying the audio match, determining that the first segment of the audio file does not correspond to any segment of a second source audio associated with the audiovisual program.

14. The one or more non-transitory computer-readable storage media of claim 13, wherein the second source audio comprises spoken dialog for a first episode of the audiovisual program, and the first source audio comprises spoken dialog for a second episode of the audiovisual program.

15. The one or more non-transitory computer-readable storage media of claim 10, further comprising, prior to identifying the audio match, identifying the first segment of the audio file based on an audio edit included in an edit decision list associated with the sequence of segments of the audiovisual program.

16. The one or more non-transitory computer-readable storage media of claim 10, wherein the at least one additional mapped subtitle comprises a second mapped subtitle associated with a different segment of the audio file.

17. The one or more non-transitory computer-readable storage media of claim 10, wherein generating the subtitle list comprises:
   determining that the first mapped subtitle does not comply with a subtitle guideline;
   modifying the first mapped subtitle based on the subtitle guideline to generate a first compliant subtitle; and
   aggregating the first compliant subtitle and the at least one additional mapped subtitle to generate at least a portion of the subtitle list.

18. The one or more non-transitory computer-readable storage media of claim 17, wherein the subtitle guideline specifies at least one of a minimum frame gap and a minimum time gap between subtitles.

19. A system, comprising:
   one or more memories storing instructions; and
   one or more processors that are coupled to the one or more memories and, when executing the instructions, are configured to:
      perform one or more matching operations between an audio file associated with a sequence of segments of an audiovisual program and a first source audio to determine that a first segment of the audio file does not correspond to any segment of the first source audio, wherein the first source audio and a second source audio are included in a plurality of source audios associated with the audiovisual program;
      perform one or more matching operations between the audio file and the second source audio to determine that the first segment of the audio file corresponds to a second segment of the second source audio;
      in response to determining that the first segment of the audio file corresponds to the second segment of the second source audio, map a first subtitle associated with the second segment of the second source audio from a source timeline associated with the second source audio to a portion of a timeline associated with the first segment of the audio file to generate a first mapped subtitle; and
      generate a subtitle list based on the first mapped subtitle and at least one additional mapped subtitle.

20. The system of claim 19, wherein the instructions configure to processor to perform the one or more matching operations between the audio file and the second source audio by:
   computing a cross-correlation between the first segment of the audio file and a third segment of the second source audio, wherein the third segment of the second source audio includes the second segment of the second source audio;
   identifying the second segment of the second source audio based on the cross-correlation;
   computing a match strength based on the cross-correlation; and
   determining that the first segment of the audio file corresponds to the second segment of the second source audio based on the match strength.

* * * * *